US012764577B2

(12) United States Patent
Yang et al.

(10) Patent No.: US 12,764,577 B2
(45) Date of Patent: Oct. 13, 2026

(54) MEASUREMENT BASED ON MEASUREMENT GAP

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Jinyup Hwang, Seoul (KR); Jinwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 362 days.

(21) Appl. No.: 18/259,755

(22) PCT Filed: Jan. 13, 2022

(86) PCT No.: PCT/KR2022/000629
§ 371 (c)(1),
(2) Date: Jun. 28, 2023

(87) PCT Pub. No.: WO2022/154509
PCT Pub. Date: Jul. 21, 2022

(65) Prior Publication Data

US 2024/0080694 A1 Mar. 7, 2024

(30) Foreign Application Priority Data

Jan. 14, 2021 (KR) ........................ 10-2021-0005605

(51) Int. Cl.
*H04W 24/10* (2009.01)

(52) U.S. Cl.
CPC .................................. *H04W 24/10* (2013.01)

(58) Field of Classification Search
CPC ........................... H04L 5/001; H04W 36/0088
USPC ...................................................... 455/422.1
See application file for complete search history.

(56) References Cited

U.S. PATENT DOCUMENTS

| | | | | |
|---|---|---|---|---|
| 2018/0084448 | A1* | 3/2018 | Yang | H04L 5/003 |
| 2018/0227785 | A1 | 8/2018 | Yiu et al. | |
| 2019/0021017 | A1* | 1/2019 | Nagaraja | H04L 5/0048 |
| 2019/0246420 | A1* | 8/2019 | Park | H04W 72/23 |
| 2019/0306734 | A1* | 10/2019 | Huang | H04W 24/08 |
| 2022/0123879 | A1* | 4/2022 | Munier | H04W 64/00 |

FOREIGN PATENT DOCUMENTS

| | | |
|---|---|---|
| WO | 2016-153286 | 9/2016 |
| WO | 2017-138985 | 8/2017 |

OTHER PUBLICATIONS

European Patent Office Application Serial No. 22739704.9, Search Report dated Oct. 30, 2024, 12 pages.

(Continued)

*Primary Examiner* — Fabricio R Murillo Garcia
(74) *Attorney, Agent, or Firm* — LEE, HONG, DEGERMAN, KANG & WAIMEY

(57) ABSTRACT

There is provided a method for performing communication. The method performed by a UE and comprising: receiving measurement configuration information from a base station; and performing measurement for the plurality of cells based on the each of the multiple MG patterns, which is configured based on the MG information.

7 Claims, 14 Drawing Sheets

(56) References Cited

OTHER PUBLICATIONS

Intel et al., “Motivation to introduce new SI of MG enhancement,” R4-2006549, 3GPP TSG-RAN WG4 Meeting #95-e, Electronic Meeting, May 2020, 6 pages.
LG Electronics, “Discussion on multiple concurrent and independent MG patterns,” R4-2100641, 3GPP TSG-RAN WG4 Meeting # 98-e, Electronic Meeting, Jan. 2021, 7 pages.
Korean Intellectual Property Office Application No. 10-2023-7019422, Office Action dated Nov. 7, 2025, 5 pages.

* cited by examiner

FIG. 4

| Gap Pattern Id | Measurement Gap Length (MGL, ms) | Measurement Gap Repetition Period (MGRP, ms) |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |
| 24 | 10 | 80 |
| 25 | 20 | 160 |

FIG. 5

| Measurement gap pattern configuration | Serving cell | Measurement Purpose [Note 5] | Applicable Gap Pattern Id |
|---|---|---|---|
| Per-UE Measurement gap | E-UTRA + FR1, or E-UTRA + FR2, or E-UTRA + FR1 + FR2 | non-NR RAT [Note 1] | 0, 1, 2, 3, |
| | | FR1 and/or FR2 | 0-11, 24, 25 |
| | | non-NR RAT [Note 1] and FR1 and/or FR2 | 0, 1, 2, 3, 4, 6, 7, 8, 10, 24, 25 |
| Per-FR Measurement gap | E-UTRA and, FR1 if configured | non-NR RAT [Note 1] | 0, 1, 2, 3, |
| | FR2 if configured | | No gap |
| | E-UTRA and, FR1 if configured | FR1 only | 0-11 |
| | FR2 if configured | | No gap |
| | E-UTRA and, FR1 if configured | FR2 only | No gap |
| | FR2 if configured | | 12-23 |
| | E-UTRA and, FR1 if configured | non-NR RAT [Note 1] and FR1 | 0, 1, 2, 3, 4, 6, 7, 8, 10 |
| | FR2 if configured | | No gap |
| | E-UTRA and, FR1 if configured | FR1 and FR2 | 0-11 |
| | FR2 if configured | | 12-23 |
| | E-UTRA and, FR1 if configured | non-NR RAT [Note 1] and FR2 | 0, 1, 2, 3, 4, 6, 7, 8, 10 |
| | FR2 if configured | | 12-23 |
| | E-UTRA and, FR1 if configured | non-NR RAT [Note 1] and FR1 and FR2 | 0, 1, 2, 3, 4, 6, 7, 8, 10 |
| | FR2 if configured | | 12-23 |

FIG. 6

| Measurement gap pattern configuration | Serving cell | Measurement Purpose[Note 5] | Applicable Gap Pattern Id |
|---|---|---|---|
| Per-UE Measurement gap | FR1[Note 5], or FR1 + FR2 | non-NR RAT[Note 6] | 0, 1, 2, 3, |
| | | FR1 and/or FR2 | 0-11, 24, 25 |
| | | non-NR RAT and FR1 and/or FR2[Note 6] | 0, 1, 2, 3, 4, 6, 7, 8, 10, 24, 25 |
| | FR2[Note 5] | non-NR RAT only[Note 6] | 0, 1, 2, 3, |
| | | FR1 only | 0-11, 24, 25 |
| | | FR1 and/or FR2 | 0-11, 24, 25 |
| | | non-NR RAT and FR1 and/or FR2[Note 6] | 0, 1, 2, 3, 4, 6, 7, 8, 10, 24, 25 |
| | | FR2 only | 12-23 |
| Per-FR Measurement gap | FR1 if configured | non-NR RAT only[Note 6] | 0, 1, 2, 3 |
| | FR2 if configured | | No gap |
| | FR1 if configured | FR1 only | 0-11 |
| | FR2 if configured | | No gap |
| | FR1 if configured | FR2 only | No gap |
| | FR2 if configured | | 12-23 |
| | FR1 if configured | non-NR RAT and FR1[Note 6] | 0, 1, 2, 3, 4, 6, 7, 8, 10 |
| | FR2 if configured | | No gap |
| | FR1 if configured | FR1 and FR2 | 0-11 |
| | FR2 if configured | | 12-23 |
| | FR1 if configured | non-NR RAT and FR2[Note 6] | 0, 1, 2, 3, 4, 6, 7, 8, 10 |
| | FR2 if configured | | 12-23 |
| | FR1 if configured | non-NR RAT and FR1 and FR2[Note 6] | 0, 1, 2, 3, 4, 6, 7, 8, 10 |
| | FR2 if configured | | 12-23 |

FIG. 9

| Measurement MG pattern configuration | Serving cell | Measurement Purpose | Applicable Gap Pattern Ids (subset of {a, b, ...} is defined as multiple MG patterns) |
|---|---|---|---|
| Per-UE Measurement gap | E-UTRA + FR1, or E-UTRA + FR2, or E-UTRA + FR1 + FR2 | non-NR RAT | Not Applicable |
| | | FR1 and/or FR2 | {0, 1, 4, 5}, {6, 7, 8, 9}, {2, 3, 10, 11} |
| | | non-NR RAT and FR1 and/or FR2 | {0, 1, 4}, {6, 7, 8}, {2, 3, 10} |
| Per-FR Measurement gap | E-UTRA and, FR1 if configured | non-NR RAT | {0, 1}, {2, 3} |
| | FR2 if configured | | No gap |
| | E-UTRA and, FR1 if configured | FR1 only | {0, 1, 4, 5}, {6, 7, 8, 9}, {2, 3, 10, 11} |
| | FR2 if configured | | No gap |
| | E-UTRA and, FR1 if configured | FR2 only | No gap |
| | FR2 if configured | | {12, 13, 14, 15}, {16, 17, 18, 19}, {20, 21, 22, 23} |
| | E-UTRA and, FR1 if configured | non-NR RAT and FR1 | {0, 1, 4}, {6, 7, 8}, {2, 3, 10} |
| | FR2 if configured | | No gap |
| | E-UTRA and, FR1 if configured | FR1 and FR2 | {0, 1, 4, 5}, {6, 7, 8, 9}, {2, 3, 10, 11} |
| | FR2 if configured | | {12, 13, 14, 15}, {16, 17, 18, 19}, {20, 21, 22, 23} |
| | E-UTRA and, FR1 if configured | non-NR RAT and FR2 | {0, 1, 4}, {6, 7, 8}, {2, 3, 10} |
| | FR2 if configured | | {12, 13, 14, 15}, {16, 17, 18, 19}, {20, 21, 22, 23} |
| | E-UTRA and, FR1 if configured | non-NR RAT and FR1 and FR2 | {0, 1, 4}, {6, 7, 8}, {2, 3, 10} |
| | FR2 if configured | | {12, 13, 14, 15}, {16, 17, 18, 19}, {20, 21, 22, 23} |

FIG. 10

| Measurement MG pattern configuration | Serving cell | Measurement Purpose | Applicable Gap Pattern Ids (subset of {a, b, ...} is defined as multiple MG patterns) |
|---|---|---|---|
| Per-UE Measurement gap | FR1, or FR1 + FR2 | non-NR RAT | Not Applicable |
| | | FR1 and/or FR2 | {0, 1, 4, 5}, {6, 7, 8, 9}, {2, 3, 10, 11} |
| | | non-NR RAT and FR1 and/or FR2 | {0, 1, 4}, {6, 7, 8}, {2, 3, 10} |
| | FR2 | non-NR RAT only | Not Applicable |
| | | FR1 only | {0, 1, 4, 5}, {6, 7, 8, 9}, {2, 3, 10, 11} |
| | | FR1 and/or FR2 | {0, 1, 4, 5}, {6, 7, 8, 9}, {2, 3, 10, 11} |
| | | non-NR RAT and FR1 and/or FR2 | {0, 1, 4}, {6, 7, 8}, {2, 3, 10} |
| | | FR2 only | {12, 13, 14, 15}, {16, 17, 18, 19}, {20, 21, 22, 23} |
| Per-FR Measurement gap | FR1 if configured | non-NR RAT only | Not Applicable |
| | FR2 if configured | | No gap |
| | FR1 if configured | FR1 only | {0, 1, 4, 5}, {6, 7, 8, 9}, {2, 3, 10, 11} |
| | FR2 if configured | | No gap |
| | FR1 if configured | FR2 only | No gap |
| | FR2 if configured | | {12, 13, 14, 15}, {16, 17, 18, 19}, {20, 21, 22, 23} |
| | FR1 if configured | non-NR RAT and FR1 | {0, 1, 4}, {6, 7, 8}, {2, 3, 10} |
| | FR2 if configured | | No gap |
| | FR1 if configured | FR1 and FR2 | {0, 1, 4, 5}, {6, 7, 8, 9}, {2, 3, 10, 11} |
| | FR2 if configured | | {12, 13, 14, 15}, {16, 17, 18, 19}, {20, 21, 22, 23} |
| | FR1 if configured | non-NR RAT and FR2 | {0, 1, 4}, {6, 7, 8}, {2, 3, 10} |
| | FR2 if configured | | {12, 13, 14, 15}, {16, 17, 18, 19}, {20, 21, 22, 23} |
| | FR1 if configured | non-NR RAT and FR1 and FR2 | {0, 1, 4}, {6, 7, 8}, {2, 3, 10} |
| | FR2 if configured | | {12, 13, 14, 15}, {16, 17, 18, 19}, {20, 21, 22, 23} |

FIG. 11

```
--      ASN1START
--      TAG-MEASCONFIG-START

MeasConfig ::=                  SEQUENCE {
    measObjectToRemoveList          MeasObjectToRemoveList          OPTIONAL,   -- Need N
    measObjectToAddModList          MeasObjectToAddModList          OPTIONAL,   -- Need N
    reportConfigToRemoveList        ReportConfigToRemoveList        OPTIONAL,   -- Need N
    reportConfigToAddModList        ReportConfigToAddModList        OPTIONAL,   -- Need N
    measIdToRemoveList              MeasIdToRemoveList              OPTIONAL,   -- Need N
    measIdToAddModList              MeasIdToAddModList              OPTIONAL,   -- Need N
    measObjectToRemoveList_P        MeasObjectToRemoveList          OPTIONAL,   -- Need N
    measObjectToAddModList_P        MeasObjectToAddModList          OPTIONAL,   -- Need N
    reportConfigToRemoveList_P      ReportConfigToRemoveList        OPTIONAL,   -- Need N
    reportConfigToAddModList_P      ReportConfigToAddModList        OPTIONAL,   -- Need N
    measIdToRemoveList_P            MeasIdToRemoveList              OPTIONAL,   -- Need N
    measIdToAddModList_P            MeasIdToAddModList              OPTIONAL,   -- Need N
    measObjectToRemoveList_S        MeasObjectToRemoveList          OPTIONAL,   -- Need N
    measObjectToAddModList_S        MeasObjectToAddModList          OPTIONAL,   -- Need N
    reportConfigToRemoveList_S      ReportConfigToRemoveList        OPTIONAL,   -- Need N
    reportConfigToAddModList_S      ReportConfigToAddModList        OPTIONAL,   -- Need N
    measIdToRemoveList_S            MeasIdToRemoveList              OPTIONAL,   -- Need N
    measIdToAddModList_S            MeasIdToAddModList              OPTIONAL,   -- Need N
    s-MeasureConfig                 CHOICE {
        ssb-RSRP                        RSRP-Range,
        csi-RSRP                        RSRP-Range
    }                                                               OPTIONAL,   -- Need M
    quantityConfig                  QuantityConfig                  OPTIONAL,   -- Need M
    measGapConfig                   MeasGapConfig                   OPTIONAL,   -- Need M
    measGapSharingConfig            MeasGapSharingConfig            OPTIONAL,   -- Need M
    ...,
    [[
    interFrequencyConfig-NoGap-r16  ENUMERATED {true}               OPTIONAL    -- Need R
    ]]
}

MeasObjectToRemoveList ::=      SEQUENCE (SIZE (1..maxNrofObjectId)) OF MeasObjectId
MeasIdToRemoveList ::=          SEQUENCE (SIZE (1..maxNrofMeasId)) OF MeasId
ReportConfigToRemoveList ::=    SEQUENCE (SIZE (1..maxReportConfigId)) OF ReportConfigId

--      TAG-MEASCONFIG-STOP
--      ASN1STOP
```

FIG. 12

```
--        ASN1START
--        TAG-MEASGAPCONFIG-START

MeasGapConfig ::=             SEQUENCE {
    gapFR2                    SetupRelease { GapConfig }    OPTIONAL,   -- Need M
     gapFR2_P                  SetupRelease { GapConfig }    OPTIONAL,   -- Need M
     gapFR2_S1                 SetupRelease { GapConfig }    OPTIONAL,   -- Need M
     gapFR2_S2                 SetupRelease { GapConfig }    OPTIONAL,   -- Need M
     gapFR2_S3                 SetupRelease { GapConfig }    OPTIONAL,   -- Need M
...,
    [[
    gapFR1                    SetupRelease { GapConfig }    OPTIONAL,   -- Need M
     gapFR1_P                  SetupRelease { GapConfig }    OPTIONAL,   -- Need M
     gapFR1_S1                 SetupRelease { GapConfig }    OPTIONAL,   -- Need M
     gapFR1_S2                 SetupRelease { GapConfig }    OPTIONAL,   -- Need M
     gapFR1_S3                 SetupRelease { GapConfig }    OPTIONAL,   -- Need M
    gapUE                     SetupRelease { GapConfig }    OPTIONAL    -- Need M
     gapUE_P                   SetupRelease { GapConfig }    OPTIONAL    -- Need M
     gapUE_S1                  SetupRelease { GapConfig }    OPTIONAL    -- Need M
     gapUE_S2                  SetupRelease { GapConfig }    OPTIONAL    -- Need M
     gapUE_S3                  SetupRelease { GapConfig }    OPTIONAL    -- Need M
]]

}

GapConfig ::=                SEQUENCE {
    gapOffset                  INTEGER (0..159),
     gapOffset_P                INTEGER (0..159),
     gapOffset_S1               INTEGER (0..159),
     gapOffset_S2               INTEGER (0..159),
     gapOffset_S3               INTEGER (0..159),
    mgl                       ENUMERATED {ms1dot5, ms3, ms3dot5, ms4, ms5dot5, ms6},
    mgrp                      ENUMERATED {ms20, ms40, ms80, ms160},
    mgta                      ENUMERATED {ms0, ms0dot25, ms0dot5},
    ...,
    [[
    refServCellIndicator        ENUMERATED {pCell, pSCell, mcg-FR2}  OPTIONAL   -- Cond NEDCorNRDC
    ]],
    [[
    refFR2ServCellAsyncCA-r16       ServCellIndex               OPTIONAL,   -- Cond AsyncCA
    mgl-r16                   ENUMERATED {ms10, ms20}         OPTIONAL    -- Cond PRS
    ]]
}

--        TAG-MEASGAPCONFIG-STOP
```

MEASUREMENT BASED ON MEASUREMENT GAP

CROSS-REFERENCE TO RELATED APPLICATIONS

This application is the National Stage filing under 35 U.S.C. 371 of International Application No. PCT/KR2022/000629, filed on Jan. 13, 2022, which claims the benefit of earlier filing date and right of priority to Korean Patent Application No. 10-2021-0005605, filed on Jan. 14, 2021, the contents of which are all incorporated by reference herein in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

User Equipment (UE) can perform measurement based on measurement gap (MG). Conventionally, only one MG could be configured, and the UE performed measurement by sharing the only one MG. In NR, in consideration of terminal implementation, capability for per-UE MG and per-FR (Frequency Range) MG and MG Pattern ID corresponding to each MG were defined.

However, when network needs more information based on measurement, measurement based on only one MG was limited to provide enough information based on measurement. Thus, discussion for enhancing performance of measurement based on MG is needed to be introduced. For example, multiple MGs needed to be discussed. For example, Procedures for configuration of multiple MG, configurable MG pattern IDs, and the maximum number of MG settings are needed to be clearly defined.

SUMMARY

Accordingly, a disclosure of the present specification has been made in an effort to solve the aforementioned problem.

Accordingly, a disclosure of the present specification has been made in an effort to solve the aforementioned problem.

In accordance with an embodiment of the present disclosure, a disclosure of the present specification provides a method for performing communication. The method is performed by a UE and comprising: receiving measurement configuration information from a base station; and performing measurement for the plurality of cells based on the each of the multiple MG patterns, which is configured based on the MG information.

In accordance with an embodiment of the present disclosure, a disclosure of the present specification provides a UE in a wireless communication system, the UE comprising: at least one transceiver; at least one processor; and at least one computer memory operably connectable to the at least one processor and storing instructions that, based on being executed by the at least one processor, perform operations comprising: receiving measurement configuration information from a base station; and performing measurement for the plurality of cells based on the each of the multiple MG patterns, which is configured based on the MG information.

In accordance with an embodiment of the present disclosure, a disclosure of the present specification provides wireless communication device operating in a wireless communication system, the wireless communication device comprising: identifying measurement configuration information; and performing measurement for the plurality of cells based on the each of the multiple MG patterns, which is configured based on the MG information.

In accordance with an embodiment of the present disclosure, a disclosure of the present specification provides CRM storing instructions that, based on being executed by at least one processor, perform operations comprising: identifying measurement configuration information; and performing measurement for the plurality of cells based on the each of the multiple MG patterns, which is configured based on the MG information.

In accordance with an embodiment of the present disclosure, a disclosure of the present specification provides a method for performing communication. The method is performed by a base station and comprising: transmitting measurement configuration information; and receiving measurement report.

In accordance with an embodiment of the present disclosure, a disclosure of the present specification provides a base station in a wireless communication system, the base station comprising: at least one transceiver; at least one processor; and at least one computer memory operably connectable to the at least one processor and storing instructions that, based on being executed by the at least one processor, perform operations comprising: transmitting measurement configuration information; and receiving measurement report.

According to a disclosure of the present disclosure, the above problem of the related art is solved.

Performance of measurement based on MG is enhanced. For example, measurement based on measurement gap may be performed efficiently and/or precisely. For example, measurement based on multiple measurement gap may performed efficiently and/or precisely. For example performance degradation due to MG may be reduced.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 4 illustrates an example of Gap Pattern configuration.

FIG. 5 illustrates an example of Applicability for Gap Pattern Configurations supported by UE.

FIG. 6 illustrates an example of Applicability for Gap Pattern Configurations supported by UE supporting NR standalone operation.

FIG. 9 illustrates a first proposed example of Applicability for Gap Pattern Configurations FIG. 10 illustrates a second proposed example of Applicability for Gap Pattern Configurations FIG. 11 illustrates an example of measurement configuration IE according to embodiments of the present disclosure.

FIG. 12 illustrates an example of Measurement Gap Configuration IE according to embodiments of the present disclosure.

DETAILED DESCRIPTION

Figure 1:
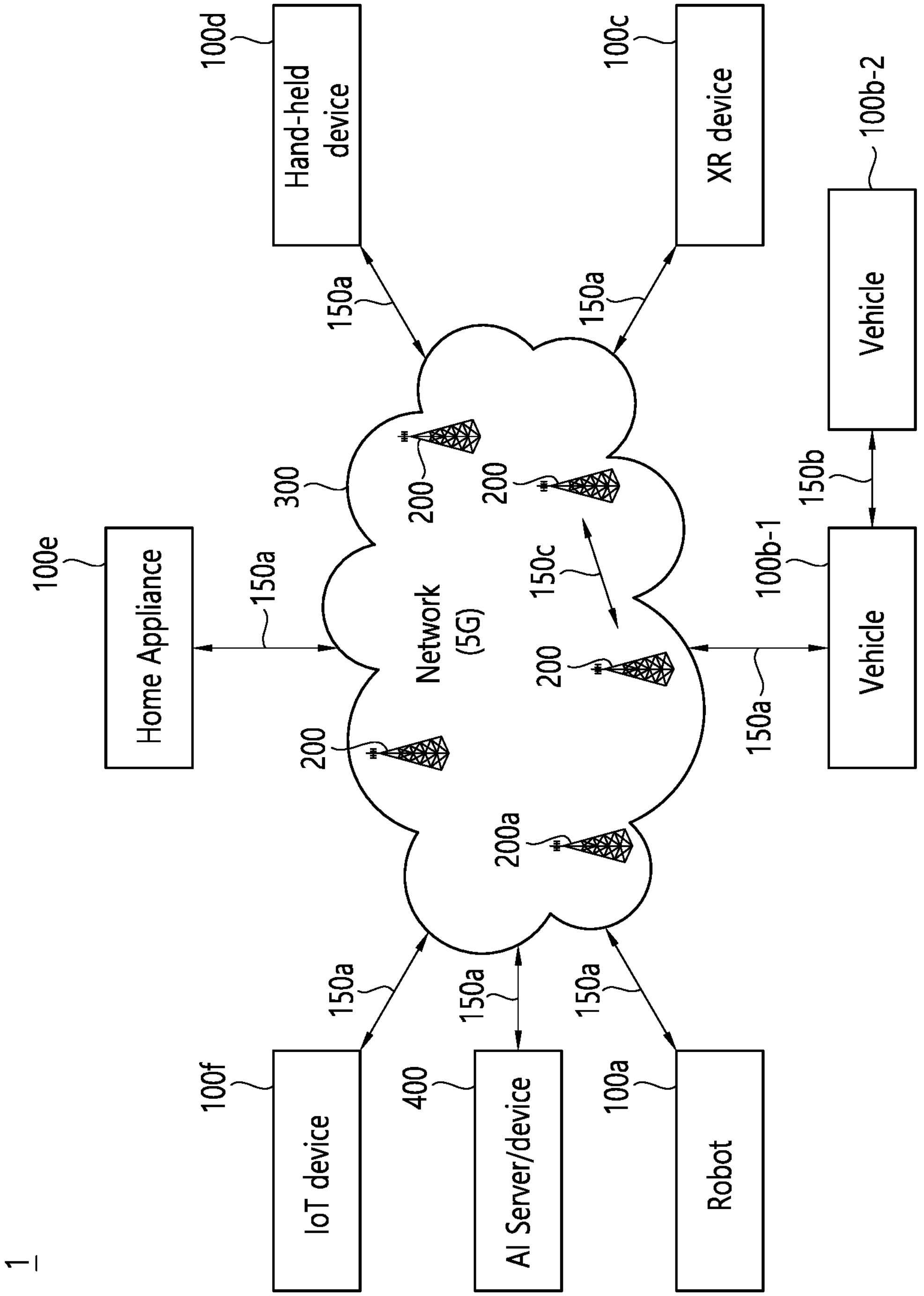
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Although user equipment (UE) is illustrated in the accompanying drawings by way of example, the illustrated UE may be referred to as a terminal, mobile equipment (ME), and the like. In addition, the UE may be a portable device such as a notebook computer, a mobile phone, a PDA, a smart phone, a multimedia device, or the like, or may be a non-portable device such as a PC or a vehicle-mounted device.

Hereinafter, the UE is used as an example of a wireless communication device (or a wireless device, or a wireless apparatus) capable of wireless communication. An operation performed by the UE may be performed by a wireless communication device. A wireless communication device may also be referred to as a wireless device, a wireless device, or the like.

A base station, a term used below, generally refers to a fixed station that communicates with a wireless device. The base station may be reffered to as another term such as an evolved-NodeB (eNodeB), an evolved-NodeB (eNB), a BTS (Base Transceiver System), an access point (Access Point), gNB (Next generation NodeB), etc.

FIG. 1 Shows an Example of a Communication System to which Implementations of the Present Disclosure is Applied The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW). FR2 may include FR 2-1 and FR 2-1 as shown in Examples of Table 1 and Table 2.

TABLE 1

| Frequency Range designation | | Corresponding frequency range | Subcarrier Spacing |
|---|---|---|---|
| FR1 | | 450 MHz-6000 MHz | 15, 30, 60 kHz |
| FR2 | FR2-1 | 24250 MHz-52600 MHz | 60, 120, 240 kHz |
| | FR2-2 | 57000 MHz-71000 MHz | 120, 480, 960 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | | Corresponding frequency range | Subcarrier Spacing |
|---|---|---|---|
| FR1 | | 410 MHz-7125 MHz | 15, 30, 60 kHz |
| FR2 | FR2-1 | 24250 MHz-52600 MHz | 60, 120, 240 kHz |
| | FR2-2 | 57000 MHz-71000 MHz | 120, 480, 960 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
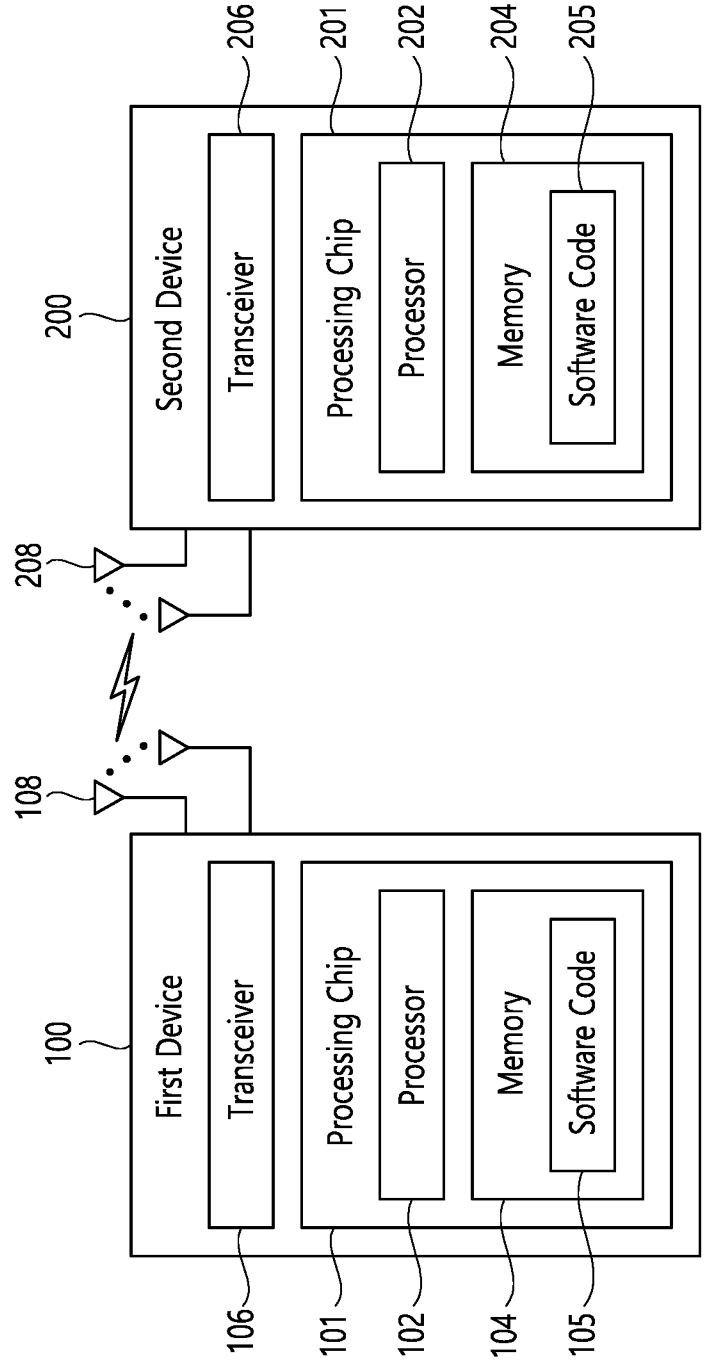
FIG. 2 shows an example of wireless devices to which implementations of the present disclosure is applied.

FIG. 2 Shows an Example of Wireless Devices to which Implementations of the Present Disclosure is Applied Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as anode B (NB), an eNode B (eNB), or a gNB.

Figure 3:
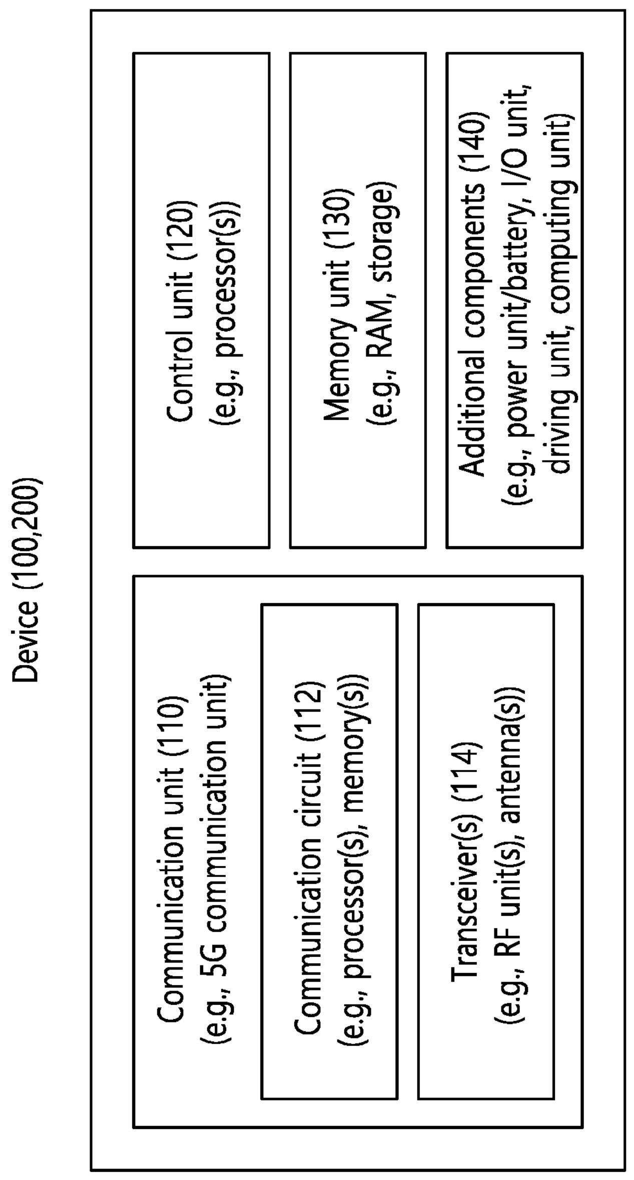
FIG. 3 shows an example of a wireless device to which implementations of the present disclosure is applied.

FIG. 3 Shows an Example of a Wireless Device to which Implementations of the Present Disclosure is Applied The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130.

The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

<Operating Band in NR>

An operating band shown in Table 3 is a refraining operating band that is transitioned from an operating band of LTE/LTE-A. This operating band is referred to as FR1 band.

TABLE 3

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n26 | 814 MHz-849 MHz | 859 MHz-894 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n46 | 5150 MHz-5925 MHz | 5150 MHz-5925 MHz | TDD |
| n47 | 5855 MHz-5925 MHz | 5855 MHz-5925 MHz | TDD |
| n48 | 3550 MHz-3700 MHz | 3550 MHz-3700 MHz | TDD |
| n50 | 1432 MHz-1517 MHz | 1432 MHz-1517 MHz | TDD1 |
| n51 | 1427 MHz-1432 MHz | 1427 MHz-1432 MHz | TDD |
| n53 | 2483.5 MHz-2495 MHz | 2483.5 MHz-2495 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |

TABLE 3-continued

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD |
| n92 | 832 MHz-862 MHz | 1432 MHz-1517 MHz | FDD |
| n93 | 880 MHz-915 MHz | 1427 MHz-1432 MHz | FDD |
| n94 | 880 MHz-915 MHz | 1432 MHz-1517 MHz | FDD |
| n95 | 2010 MHz-2025 MHz | N/A | SUL |
| n96 | 5925 MHz-7125 MHz | 5925 MHz-7125 MHz | TDD |

The following table shows an NR operating band defined at high frequencies. This operating band is referred to as FR2 band.

TABLE 4

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 39500 MHz-43500 MHz | 39500 MHz-43500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |
| n262 | 47200 MHz-48200 MHz | 47200 MHz-48200 MHz | TDD |
| n263 | 57000 MHz-71000 MHz | 57000 MHz-71000 MHz | TDD |

<Disclosure of the Present Specification 22

User Equipment (UE) can perform measurement based on measurement gap (MG). Conventionally, only one MG could be configured, and the UE performed measurement by sharing the only one MG. In NR, in consideration of terminal implementation, capability for per-UE MG and per-FR (Frequency Range) MG and MG Pattern ID corresponding to each MG were defined.

However, when network needs more information based on measurement, measurement based on only one MG was limited to provide enough information based on measurement. Thus, discussion for enhancing performance of measurement based on MG is needed to be introduced. For example, multiple MGs needed to be discussed. For example, Procedures for configuration of multiple MG, configurable MG pattern IDs, and the maximum number of MG settings are needed to be clearly defined.

In various examples of the present specification, MG enhancement will be explained. For example, as an example of MG enhancement, the use of multiple MG patterns may be proposed, and configuring methods for multiple MGs and standards for multiple MGs may be proposed.

Hereinafter, disclosure of the present specification is explained with various examples. For reference, the following examples may be applied independently or applied based on a combination of one or more examples.

Related to NR measurement gap enhancements, the following three examples of objective may be considered.

Pre-configured MG pattern(s) per configured BWP (fast MG configuration)

Multiple concurrent and independent MG patterns

Network Controlled Small Gap (NCSG)

In the present specification, the example of objective "Multiple concurrent and independent MG patterns" will be discussed.

For example, the example of objective "Multiple concurrent and independent MG patterns" may be described as follows:

i) Radio Resource Management (RRM) requirements for concurrent and independent MG patterns
   - Define requirements for UE maximum number of concurrent and independent MG patterns active at any time
   - Specification of requirements for multiple concurrent and independent MG patterns (MGL, MGRP)
   - Specification of requirements and UE behavior for proximity of MG instances in time, priority, and partial or full overlap of MG instances
   - Define the corresponding measurement requirements ii) Specification of applicability of multiple concurrent and independent gap patterns iii) Procedures and signaling for simultaneous RRC (re-) configuration of one or more gap patterns
   - Specification of protocol impacts for multiple concurrent and independent MG patterns So far, two type of MG was defined such as per-UE MG and per-FR MG for NR UE. MG pattern ID #0~#25 was specified. Each MG pattern ID, which is included in Gap Pattern configuration, is related to MGL (Measurement Gap Length) and MGRP (Measurement Gap Reception Period) as seen in Table of FIG. 4. Applicability of the MG pattern ID was specified as seen in Table of FIG. 5 and Table of FIG. 6.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 4 Illustrates an Example of Gap Pattern Configuration

FIG. 4 shows an example of Gap pattern configuration. Gap pattern configuration is information including Gap Pattern ID, MGL, and MGRP. Gap Pattern ID may also be referred to as MG pattern ID. Each MG pattern ID consists of MGL and MGRP. For example, network (e.g. base station) may transmit Gap Pattern configuration to UE. UE may identify Gap Pattern ID included in the received Gap Pattern configuration. For example, if Gap Patter ID is 6, the UE may identify that the UE needs to use MG having MGL of 5 ms and MGRP of 20 ms. The UE may perform measurement based on MG indicated by the Gap Patter Configuration.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 5 Illustrates an Example of Applicability for Gap Pattern Configurations Supported by UE FIG. 5 shows example of Applicability for Gap Pattern Configurations supported by the E-UTRA-NR dual connectivity UE or NR-E-UTRA dual connectivity UE.

Example of FIG. 5 shows measurement gap pattern configuration, serving cell, measurement purpose and Applicable Gap Pattern ID. Example of FIG. 5 may show Applicable Gap Pattern ID which corresponds to a combination of measurement gap pattern configuration, serving cell and measurement purpose.

For example, if measurement gap pattern configuration is related to Per-UE MG, serving cells are related to E-UTRA serving cell and FR1 NR serving cell, and measurement purpose is to measure signal from FR1 serving cell, Gap Pattern ID 0-11, 24, 25 are applicable.

Per-UE MG may mean MG configured per UE for UE with one measurement module. Per-FR MG may mean MG configured per FR for UE with one measurement module in FR1 and another measurement module in FR2.

For Example of FIG. 5, the following notes are applied:

Note: In E-UTRA-NR dual connectivity mode, if Global System for Mobile communications (GSM) or Universal Terrestrial Radio Access (UTRA) TDD or UTRA FDD inter-RAT frequency layer is configured to be monitored, only measurement gap pattern #0 and #1 can be used for per-FR gap in E-UTRA and FR1 if configured, or for per-UE gap. In NR-E-UTRA dual connectivity mode, if UTRA FDD inter-RAT frequency layer is configured to be monitored for Single Radio Voice Call Continuity (SRVCC), only measurement gap pattern #0 and #1 can be used for per-FR gap in E-UTRA and FR1 if configured, or for per-UE gap.

NOTE 1: In E-UTRA-NR dual connectivity mode, non-NR RAT includes E-UTRA, UTRA and/or GSM. In NR-E-UTRA dual connectivity mode, non-NR RAT means E-UTRA, and UTRA for SRVCC.

NOTE 3: When E-UTRA inter-frequency RSTD measurements are configured and the UE requires measurement gaps for performing such measurements, only Gap Pattern #0 can be used.

NOTE 4: For UE only supporting supportedGapPattern-NRonly for any gap patterns among GP2-11, the corresponding gap patterns are not applicable to any measurement in this table. For UE supporting supportedGapPattern-NRonly-NEDC or measGapPatterns-NRonly-ENDC-r16 but not supporting supportedGapPattern for the corresponding gap patterns among GP2-11, the corresponding gap patterns are not applicable to measurement of non-NR RATs as defined in NOTE 1. Herein, supportedGapPattern-NRonly may mean NR measurement gap pattern which is supported to perform only NR measurements. supportedGapPattern-NRonly-NEDC may mean NR measurement gap pattern which is supported to perform NR measurements in NE-DC. measGapPatterns-NRonly-ENDC-r16 may mean NR measurement gap pattern to perform NR measurements in EN-DC. supportedGapPattern may mean measurement gap pattern which is supported.

NOTE 5: Inclusion of positioning measurements: Measurement purpose which includes E-UTRA measurements includes also E-UTRA RSRP and E-UTRA RSRQ measurements for Enhanced Cell Identification (E-CID); measurement purpose which includes any of FR1 and FR2 measurements includes also RSTD, UE Rx-Tx, and PRS-RSRP measurements.

NOTE 6: Measurement gap patterns #24 and #25 can be requested only when the UE is configured at least with any of reference signal time difference (RSTD), UE Rx-Tx, or PRS-RSRP measurements requiring such gaps and can only be used during the corresponding positioning measurement period The following drawings are prepared to explain a specific example of the present specification. Since the names of specific devices or names of specific signals/messages/fields described in the drawings are provided by way of example, technical features of the present specification are not limited to specific names used in the following drawings.

FIG. 6 Illustrates an Example of Applicability for Gap Pattern Configurations Supported by UE Supporting NR Standalone Operation FIG. 6 shows example of Applicability for Gap Pattern Configurations supported by the UE with NR standalone operation (with single carrier, NR CA and NR-DC configuration).

Example of FIG. 6 shows measurement gap pattern configuration, serving cell, measurement purpose and Applicable Gap Pattern ID. Example of FIG. 5 may show Applicable Gap Pattern ID which corresponds to a combination of measurement gap pattern configuration, serving cell and measurement purpose.

For example, if measurement gap pattern configuration is related to Per-UE MG, serving cells are related to FR1 NR serving cell and FR2 NR serving cell, and measurement purpose is to measure signal from FR1 serving cell and/or FR2 serving cell, Gap Pattern ID 0-11, 24, 25 are applicable.

For Example of FIG. 6, the following notes are applied:

NOTE 1: When E-UTRA inter-RAT RSTD measurements are configured and the UE requires measurement gaps for performing such measurements, only Gap Pattern #0 can be used.

NOTE 2: Measurement purpose which includes E-UTRA measurements includes also inter-RAT E-UTRA RSRP and RSRQ measurements for E-CID; measurement purpose which includes E-UTRA measurements includes also E-UTRA RSRP and E-UTRA RSRQ measurements for E-CID; measurement purpose which includes any of FR1 or FR2 measurements includes also RSTD, UE Rx-Tx, and PRS-RSRP measurements.

NOTE4: If per-UE measurement gap is configured with MG timing advance of $T_{MG}$ ms, the measurement gap starts at time $T_{MG}$ ms advanced to the end of the latest subframe occurring immediately before the configured measurement gap among all serving cells subframes.

If per-FR measurement gap for FR1 is configured with MG timing advance of $T_{MG}$ ms, the measurement gap for FR1 starts at time $T_{MG}$ ms advanced to the end of the latest subframe occurring immediately before the configured measurement gap among serving cells subframes in FR1.

If per-FR measurement gap for FR2 is configured with MG timing advance of $T_{MG}$ ms, the measurement gap for FR2 starts at time $T_{MG}$ ms advanced to the end of the latest subframe occurring immediately before the configured measurement gap among serving cells subframes in FR2.

$T_{MG}$ is the MG timing advance value provided in mgta, which includes information related to MG timing advance.

In determining the measurement gap starting point, UE shall use the DL timing of the latest subframe occurring immediately before the configured measurement gap among serving cells.

NOTE 5: NR-DC in Rel-15 only includes the scenarios where all serving cells in MCG in FR1 and all serving cells in SCG in FR2.

NOTE 6: In NR single carrier, NR CA, and NR-DC mode, non-NR RAT means E-UTRA, and UTRA for SRVCC. In NR single carrier, NR CA, and NR-DC mode, if UTRA FDD inter-RAT frequency layer is configured to be monitored for SRVCC, only measurement gap pattern #0 and #1 can be used for per-FR gap in E-UTRA and FR1 if configured, or for per-UE gap.

NOTE 7: For UE only supporting supportedGapPattern-NRonly for any gap patterns among GP2-11, the corresponding gap patterns are not applicable to measurement of non-NR RATs as defined in NOTE 6.

NOTE 8: Measurement gap patterns #24 and #25 can be requested only when the UE is configured with any of RSTD, UE Rx-Tx, or PRS-RSRP measurements requiring such gaps and can only be used during the corresponding positioning measurement period.

In exemplary Table of FIG. 5, MG pattern ID #0~#11 was defined for NR FR1 measurements and MG pattern ID #12~#23 was defined for NR FR2 measurements. Generally, for UE capable of per-UE MG, MG pattern ID #0~#11 is applicable. On the other hand, for UE capable of per-FR MG, MG pattern ID #0~#23 is applicable.

Conventionally, regarding UE capability and applicability of the MG pattern ID, network must provide either a single per-UE MG pattern or per-FR MG patterns if UE requires MGs to identify and measure intra-frequency cells and/or inter-frequency cells and/or inter-RAT E-UTRAN cells.

For UE to perform NR measurement using MG, the following conditions should be met:

- SS/PBCH block measurement timing configuration (SMTC) window duration is located within MGL; and
- Signal (SS)/Physical Broadcast Channel (PBCH) block blocks of target Cell is located within SMTC window duration.

However, SMTC periodicity can be different from MG periodicity. And SSB periodicity of target Cell can be also different from SMTC periodicity.

The 2 conditions are restrictions to network and UE for configuration of MG and SMTC.

The conditions are restrictions to network and UE for configuration of MG and SMTC.

If multiple target Cells, which to be measured, have different time offset for each SSB blocks, it is impossible for UE to measure the whole target Cells, because conventionally, SMTC configurations are only supported with same SMTC offset. It is because that the UE cannot measure signals from the whole target cells because one SMDC window with the same offset cannot cover signals from multiple target Cells transmitting signal on SSB blocks having different time offset.

Even though SMTC configurations can be supported with different SMTC offset, it is also impossible for UE to measure on the whole target Cells if UE supports only a single MG pattern with fixed MG offset. For SMTC configuration, parameter of 'periodicityAndOffset' is defined for periodicity and offset of SMTC window.

To sum up, only one MG was configured for the UE to measure multiple target cells. Thus, it was impossible for the UE to measure signals from the whole target Cells, when the target cells have different time offset for each SSB blocks.

Also, for example, when network needs more information based on measurement, measurement based on only one MG was limited to provide enough information based on measurement. Thus, discussion for enhancing performance of measurement based on MG is needed to be introduced. For example, multiple MGs needed to be discussed. For example, Procedures for configuration of multiple MG, configurable MG pattern IDs, and the maximum number of MG settings are needed to be clearly defined Examples of the present specification suggests multiple MGs for measurement.

If UE can support multiple MGs with different MG offset, UE can measure on the whole target Cells. Multiple MG patterns can consist of same/different MG pattern IDs with different MG offset.

Figure 7:
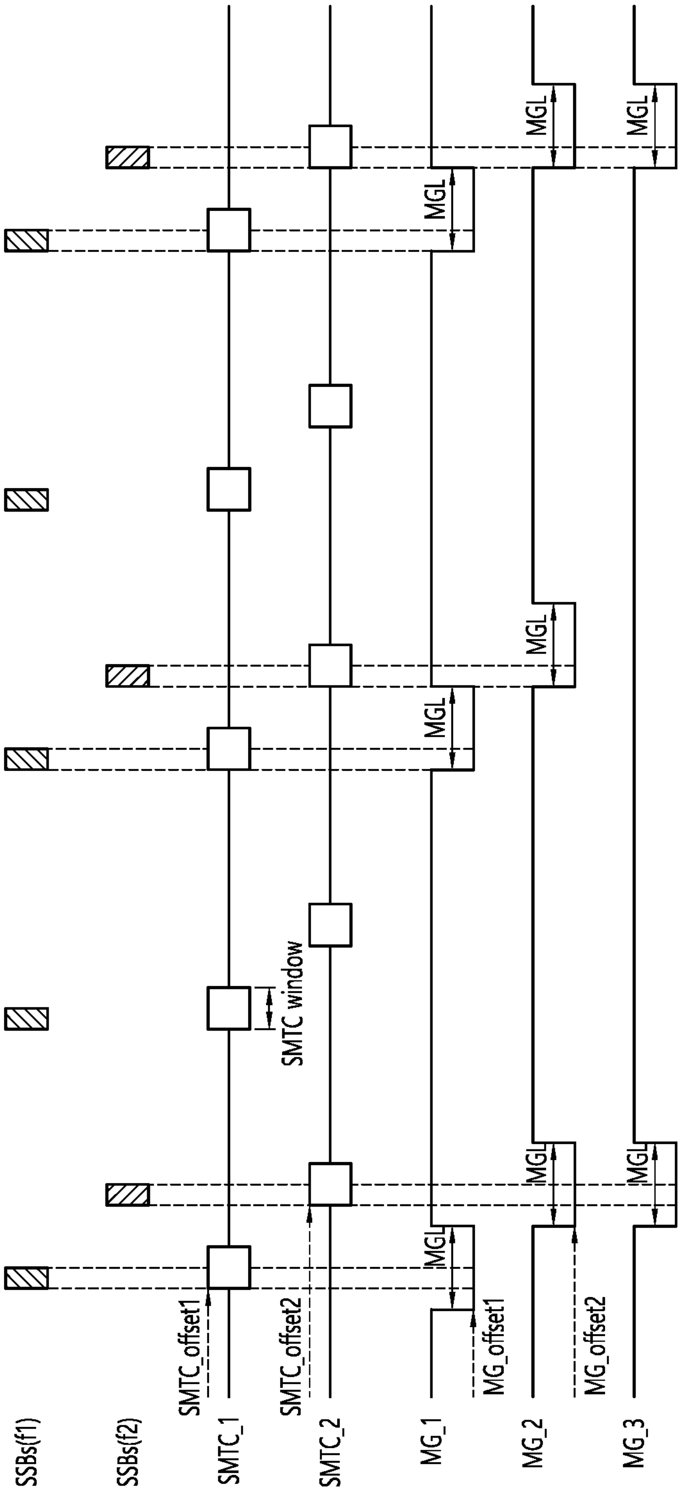
FIG. 7 illustrates a first example of multiple MG patterns.
Figure 8:
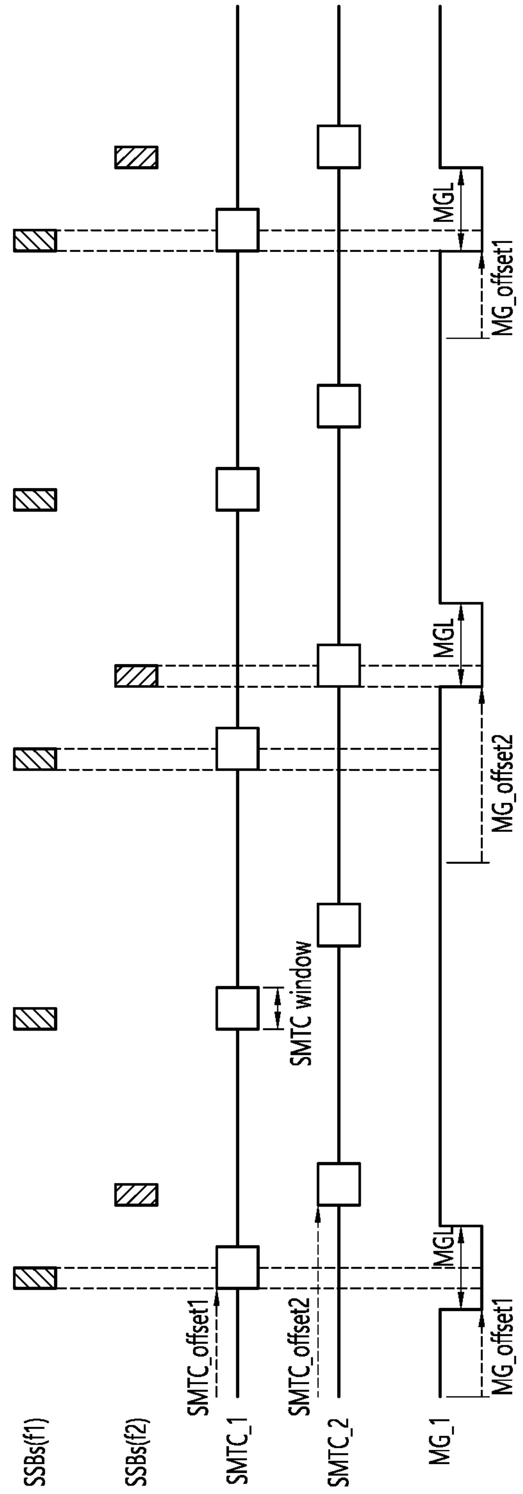
FIG. 8 illustrates a second example of multiple MG patterns.

FIG. 7 shows a first example of multiple MG patterns. FIG. 8 shows a second example of multiple MG patterns.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 7 Illustrates a First Example of Multiple MG Patterns

FIG. 2.1 shows one example for multiple MG patterns with {MG_1 and MG_2} or {MG_1 and MG_3}.

In example of FIG. 7, first target cell on f1 and second target cell on f2 have different period value for SSB and different offset value for SSB. For example, SMTC_1 for measuring SSBs on f1 and SMTC_2 for measuring SSBs on f2 have different offset value for SMTC windows.

MG-1 to MG_3 are an example of multiple MG patterns.

{MG_1 and MG_2} have same MG pattern ID with different MG offset.

{MG_1 and MG_3} have different MG pattern ID with different MG offset.

The UE can measure target Cells of f1 and f2 with multiple MG patterns with {MG_1 and MG_2} or {MG_1 and MG_3}. MG_1 can be used to measure target Cell1 of f1, and MG_2 or MG_3 can be used to measure target Cell2 of f2.

According to the first example shown in FIG. 7, the following may be proposed:

Example 1 of proposal: For multiple MG patterns, define same MG pattern IDs with different MG offset and/or different MG pattern IDs with different MG offset.

For example, according to example 1 of proposal, multiple MG patterns may have same patter IDs with different MG offset. Also, multiple MGs may have different MG pattern IDs with different MG offset.

In addition, UE can also measure on the whole target Cells with a single MG with multiple MG offsets. That is, Multiple MG patterns may have a single MG pattern ID with multiple MG offsets as shown in example of FIG. 8.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 8 Illustrates a Second Example of Multiple MG Patterns

In example of FIG. 8, first target cell on f1 and second target cell on f2 have different period value for SSB and different offset value for SSB. For example, SMTC_1 for measuring SSBs on f1 and SMTC_2 for measuring SSBs on f2 have different offset value for SMTC windows.

FIG. 8 shows another example for a single MG patterns with MG_1 with multiple MG offsets. UE can measure target Cells of f1 and f2 with the MG pattern. MG_1 with MG offset1 can be used to measure target Cell1 of f1, and MG_1 with MG offset2 can be used to measure target Cell2 of f2.

That is, multiple MG patterns shown in Example of FIG. 8 are based on single MG pattern ID with multiple MG offsets.

According to the second example shown in FIG. 8, the following may be proposed:

Example 2 of proposal: For multiple MG patterns, define single MG pattern ID with multiple MG offsets.

For example, according to example 2 of proposal, multiple MG patterns may have single MG pattern ID with multiple MG offsets.

For multiple MG patterns, UE capability for per-UE MG/per-FR MG and applicability of MG pattern ID should be considered. The existing applicability of MG pattern ID may be used as a basis for defining multiple MG patterns. In other words, multiple MG patterns can be defined by selecting among applicable MG pattern IDs in FIG. 5 and FIG. 6. Here, the multiple MG patterns need to be defined separately for FR1 and FR2 regarding UE RF architecture.

The following may be proposed:

Example 3 of proposal: For UE capable of per-UE MG, define multiple MG patterns from MG pattern ID #0~#11.

Example 4 of proposal: For UE capable of per-FR MG, define multiple MG patterns from MG pattern ID #0~#11 for FR1 NR measurements and, define multiple MG patterns from MG pattern ID #12~#23 for FR2 NR measurements.

Example 5 of proposal: In Example 3 and 4 of proposal, define multiple MG patterns by using the existing applicable MG pattern IDs in FIG. 5 and FIG. 6.

If SMTCs are configured with same SMTC window duration, MG pattern IDs with same MGL can be considered as multiple MG patterns. Herein, "SMTCs are configured with same SMTC window duration" may mean that SMTCs for a plurality of cells are configured with same SMTC window duration and same or different offsets. For example, according to FIG. 4, MG pattern IDs having same MGL may be as follows:

MGL of 6 ms: MG pattern IDs #0, #1, #4, #5
MGL of 4 ms: MG pattern IDs #6, #7, #8, #9
MGL of 3 ms: MG pattern IDs #2, #3, #10, #11
MGL of 5.5 ms: MG pattern IDs #12, #13, #14, #15
MGL of 3.5 ms: MG pattern IDs #16, #17, #18, #19
MGL of 1.5 ms: MG pattern IDs #20, #21, #22, #23

Example 6a of proposal: Consider MG pattern IDs having same MGL for multiple MG patterns, if SMTCs are configured with same SMTC window duration. For example, when SMTCs are configured with same SMTC window duration, MG pattern IDs having same MGL may be used for multiple MG patterns.

According to Example 6a of proposal, for example, a network (e.g. base station) may configure multiple MG patterns to a UE based on MG pattern IDs (e.g. MG pattern IDs #0, #1, #4, #5) having MGL of 6 ms, when SMTCs are configured with same SMTC window duration. UE may perform measurement based on the multiple MG patterns based on MG pattern IDs (e.g. MG pattern IDs #0, #1, #4, #5) having MGL of 6 ms.

If SMTCs are configured with different SMTC window duration, MG pattern IDs with MGL which can cover each SMTC window duration can be considered as multiple MG patterns. For example, MG pattern IDs with MGL, which can cover each SMTC window duration of the SMTCs configured with different SMTC window duration, can be configured as multiple MG patterns.

Example 6b of proposal: If SMTCs are configured with different SMTC window duration, consider MG pattern IDs with MGL which can cover each SMTC window duration for multiple MG patterns.

According to Example 6b of proposal, for example, a network (e.g. base station) may configure multiple MG patterns to a UE based on MG pattern IDs (e.g. MG pattern IDs #0, #1, #4, #5) having MGL of 6 ms and MG pattern IDs (e.g. MG pattern IDs #20, #21, #22, #23) having MGL of 1.5 ms, when SMTCs are configured with 5 ms of SMTC window duration and 1 ms of SMTC window duration. UE may perform measurement based on the multiple MG patterns based on MG pattern IDs (e.g. MG pattern IDs #0, #1, #4, #5) having MGL of 6 ms and MG pattern IDs (e.g. MG pattern IDs #20, #21, #22, #23) having MGL of 1.5 ms.

Following FIG. 9 and FIG. 10 are examples of multiple MG patterns based on at least one of Example 1 to Example 6b of proposal.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 9 Illustrates a First Proposed Example of Applicability for Gap Pattern Configurations FIG. 9 shows example of applicability for multiple MG Pattern Configurations supported by the E-UTRA-NR dual connectivity UE or NR-E-UTRA dual connectivity UE.

FIG. 9 shows one example of multiple MG patterns for EN-DC or NE (NR-E-UTRA)-DC based on at least one of Example 1, Example 3, Example 4, Example 5, Example 6a and Example 6b of proposal. For reference, related to Example 2 of proposal, multiple MG patterns may be configured based on same MG pattern IDs (e.g. MG pattern IDs shown in FIG. 5 and FIG. 6) with different offset.

Example of FIG. 9 shows measurement gap pattern configuration, serving cell, measurement purpose and Applicable Gap Pattern ID. Example of FIG. 9 may show Applicable Gap Pattern ID which corresponds to a combination of measurement gap pattern configuration, serving cell and measurement purpose.

When the network (e.g. base station) configures multiple MG patterns, the network may use subsets of MG patterns IDs in FIG. 9. For example, if measurement gap pattern configuration is related to Per-UE MG, serving cells are related to E-UTRA serving cell and FR1 NR serving cell, and measurement purpose is to measure signal from FR1 serving cell and FR2 serving cell, Gap Pattern IDs {0, 1, 4, 5} may be applicable.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 10 Illustrates a Second Proposed Example of Applicability for Gap Pattern Configurations FIG. 10 shows one example of applicability for multiple MG Pattern Configurations supported by the UE with NR standalone operation (with single carrier, NR CA and NR-DC configuration).

FIG. 10 shows one example of multiple MG patterns for NR standalone operation (with single carrier, NR CA and NR-DC configuration) based on at least one of Example 1, Example 3, Example 4, Example 5, Example 6a and Example 6b of proposal. For reference, related to Example 2 of proposal, multiple MG patterns may be configured based on same MG pattern IDs (e.g. MG pattern IDs shown in FIG. 5 and FIG. 6) with different offset.

Example of FIG. 10 shows measurement gap pattern configuration, serving cell, measurement purpose and Applicable Gap Pattern ID. Example of FIG. 10 may show Applicable Gap Pattern ID which corresponds to a combination of measurement gap pattern configuration, serving cell and measurement purpose.

When the network (e.g. base station) configures multiple MG patterns, the network may use subsets of MG patterns IDs in FIG. 10. For example, if measurement gap pattern configuration is related to Per-UE MG, serving cells are related to FR1 NR serving cell and FR2 NR serving cell, and measurement purpose is to measure signal from FR1 serving cell and FR2 serving cell, Gap Pattern IDs {0, 1, 4, 5} may be applicable.

If multiple MG patterns are applied to UE, the UE is not required to transmit or receive data during MGLs of the multiple MGs. It means performance degradation, which is higher than performance degradation occurred for a single MG pattern, can occur. The performance degradation can be simply calculated with sum of ratio of MGL/MGRP from configuration of each MG pattern ID.

For example, multiple MG patterns are configured with MG ID #0 and MG ID #1, performance degradation is about 22.5% and it is 7.5% higher than that of single MG ID #0. It is because that ratio of MGL/MGRP for MG ID #0 is 6/40=15%, and ratio of MGL/MGRP for MG ID #1 is 6/80=7.5% according to FIG. 4. If multiple MG patterns are configured with MG ID #0 and MG ID #5, performance degradation is about 18.75% and it is 3.75% higher than that of single MG ID #0.

One way to reduce performance degradation due to multiple MG patterns is to deactivate added MG pattern IDs for multiple MG patterns after completion of measurements on corresponding target Cells. For example, network (e.g. serving cell) may activate secondary MG (s-MG) in order to let the UE to perform measurement (e.g. SSB-RSRP and/or Channel State Information (CSI)-RSRP) for a certain cell, or PRS (position RS) measurement. After the UE performs measurement and reports a result of the measurement to the network, the network may perform operation related to mobility and/or position based on the result of the measurement. When purpose with respect to the mobility and/or the position is completed, the network may deactivate s-MG in order to remove scheduling loss for the UE due to s-MG. For example, multiple MGs may include primary MG pattern and secondary MG pattern. In order to reduce performance degradation due to multiple MG pattern, the network and/or the UE may deactivate secondary MG pattern after measurement on target cells corresponding to the secondary MG pattern is completed.

At least one MG pattern ID for per-UE MG or two MG pattern IDs for per-FR MG should be activated to keep legacy measurements. Herein, legacy measurement is same as per-UE MG and per-FR MG. without configuration of multiple MG. The MG pattern ID(s), which is the at least one MG pattern ID need to be activated, can be defined as primary MG pattern ID(s). Other MG pattern IDs which can be deactivated can be defined as secondary MG patterns. In the example of multiple MG patterns with MG ID #0 and MG ID #1, if MG ID #0 may be configured to be primary MG pattern ID to perform legacy measurements, MG ID #1 may be activated or deactivated for multiple MG patterns as secondary MG pattern ID.

Another way to reduce performance degradation due to multiple MG patterns is to use MG pattern ID with largest MGRP of 160 ms as one of multiple MG pattern IDs to reduce performance degradation due to multiple MG patterns. For example, MG pattern IDs of #5, #9, #11, #15, #19, #23, and/or #25 may be used.

For primary MG pattern ID and secondary MG pattern ID, the following examples may be applied.

- For UE capable of per-UE MG, a single MG pattern ID among MG ID #0~#11 can be Primary MG pattern ID.
- For UE capable of per-FR MG, two MG pattern IDs can be Primary MG pattern IDs. For example, one MG pattern ID among MG ID #0~#11 for FR1 measurements and another MG pattern ID among MG ID #12~#23 for FR2 measurements can be Primary MG pattern IDs.
- Configured legacy MG pattern ID(s)(e.g. MG pattern IDs in FIG. 4) can be Primary MG pattern ID(s). MG pattern IDs to be added (or to be newly defined) for multiple MG patterns can be Secondary MG pattern IDs.

Example 7 of proposal: Define Primary MG pattern ID(s) and Secondary MG pattern ID(s) for multiple MG patterns.

For example, Primary MG pattern ID(s) and Secondary MG pattern ID(s) may be configured for multiple MG patterns. The network (e.g. base station) may configure Primary MG pattern ID(s) and Secondary MG pattern ID(s) for multiple MG patterns. The network (e.g. base station) may transmit information related to the Primary MG pattern ID(s) and the Secondary MG pattern ID(s). The UE may perform measurement based on multiple MG patterns, which are based on the Primary MG pattern ID(s) and the Secondary MG pattern ID(s).

Example 7-1 of proposal: In Example 7 of proposal, define Primary MG pattern ID from MG pattern ID #0~#11 (which are based on FIG. 4) for UE capable of per-UE MG.

Example 7-2 of proposal: In Example 7 of proposal, define Primary MG pattern ID per FR for UE capable of per-FR MG. For example, in case of 2 FRs, one is from MG pattern ID #0~#11 (which are based on FIG. 4) for FR1 measurements, another one is from MG ID #12~#23 (which are based on FIG. 4) for FR2 measurements.

Example 7-3 of proposal: In Example 7 of proposal, define configured legacy MG pattern ID(s)(e.g. MG pattern IDs included in example of FIG. 4) as Primary MG pattern ID(s) and define newly added MG pattern IDs as Secondary MG patter IDs.

Example 7-4 of proposal: In Example 7 of proposal, Secondary MG pattern IDs can be configured with one or more than one MG pattern ID for UE capable of per-UE MG.

Example 7-5 of proposal: In Example 7 of proposal, Secondary MG pattern IDs can be configured with one or more than one MG pattern ID per FR for UE capable of per-FR MG.

Example 8 of proposal: In Example 7 of proposal, specify that Primary MG pattern ID(s) is always activated, and Secondary MG pattern ID(s) can be activated or deactivated to reduce performance degradation due to multiple MG patterns.

Example 8-1 of proposal: In Example 8 of proposal, Secondary MG pattern ID(s) can be activated or deactivated by DCI based operation or Timer-based operation.

Example 9 of proposal: Define MG pattern ID with largest MGRP of 160 ms as one of multiple MG pattern IDs to reduce performance degradation due to multiple MG patterns.

Example 10 of proposal: Examples of procedure related to Example 7 and 8 of proposal are as follows.

a) For UE capable of per-UE MG,

UE may request MGs with multiple MG capability to Network to perform measurements. For example, the UE may transmit request message for requesting multiple MGs. The UE may transmit multiple MG capability information, which informing that the UE is capable of performing measurement based on multiple MGs, to the network. Herein, the network may be base station or serving cell.

Network may configure multiple MG patterns configurations with indicating Primary MG pattern ID and Secondary MG pattern IDs.

UE may perform measurements with multiple MG patterns and report it to Network. The UE may perform measurements based on multiple MG patterns and the UE may report measurement result to the Network.

Network may configure Secondary MG pattern IDs to be de-activated (e.g. DCI-based, or timer based) as the following:

DCI-based operation

The network may transmit DCI including information that "Secondary MG(s) to be de-activated at 'N' slot" to the UE. When UE receives a DCI indicating Secondary MG(s) to be de-activated at 'N' slot, the UE is required to stop the measurement using the Secondary MG(s) after 'N' slot; and/or Timer-based operation The network may transmit MG timer (e.g. MG-Timer), which is used for deactivating secondary MG when the timer is expired, for a Secondary MG to the UE. If a MG timer (e.g. MG-Timer) for a Secondary MG is expired at 'N' slot, the UE is required to stop the measurement using the Secondary MG(s) after 'N' slot.

UE may stop performing measurements based on the deactivated Secondary MG pattern IDs, when the Secondary MG pattern IDs is deactivated. UE may continue to perform measurements based on Primary MG pattern ID.

If needed, (e.g. in order to let the UE to perform measurement (e.g. SSB-RSRP and/or Channel State Information (CSI)-RSRP) for a certain cell or a cell which was measured with s-MG to confirm, or PRS (position RS) measurement) Network may configure Secondary MG pattern IDs to be activated (DCI-based, timer-based) as the following:

DCI-based operation

The network may transmit DCI including information that "Secondary MG(s) to be activated at 'N' slot" to the UE. When UE receives a DCI indicating Secondary MG(s) to be activated at 'N' slot, the UE is required to start the measurement using the Secondary MG(s) after 'N' slot; and/or Timer-based operation The network may transmit MG timer MG-Inactivity-Timer, which is used for activating secondary MG when the timer is expired, for a Secondary MG to the UE. If a MG timer MG-InactivityTimer for a Secondary MG is expired at 'N' slot, the UE is required to start the measurement using the Secondary MG(s) after 'N' slot.

UE may start performing measurements with activated Secondary MG pattern IDs. UE may continue to perform measurements with Primary MG pattern ID.

b) For UE capable of per-FR MG,

UE may request MGs with multiple MG capability to Network to perform measurements. For example, the UE may transmit request message for requesting multiple MGs. The UE may transmit multiple MG capability information, which informing that the UE is capable of performing measurement based on multiple MGs, to the network. Herein, the network may be base station or serving cell.

Network may configure multiple MG patterns configurations with indicating Primary MG pattern ID and Secondary MG pattern IDs.

UE may perform measurements with multiple MG patterns per FR and report it to Network. The UE may perform measurements based on multiple MG patterns and the UE may report measurement result to the Network.

Network may configure Secondary MG pattern IDs per FR to be de-activated independently (e.g. DCI-based, or timer based). For example, for per-FR MG, the serving cell may configure primary MG and secondary MG for FR 1, and the serving cell may configure primary MG and secondary MG for FR2. In this case, the serving cell may deactivate secondary MG for FR1 and secondary MG for FR 2 independently. Network may configure Secondary MG pattern IDs per FR to be de-activated independently (e.g. DCI-based, or timer based) as the following:

DCI-based operation

The network may transmit DCI including information that "Secondary MG(s) to be de-activated at 'N' slot" to the UE. When UE receives a DCI indicating Secondary MG(s) to be de-activated at 'N' slot, the UE is required to stop the measurement using the Secondary MG(s) after 'N' slot; and/or Timer-based operation The network may transmit MG timer (e.g. MG-Timer), which is used for deactivating secondary MG when the timer is expired, for a Secondary MG to the UE. If a MG timer (e.g. MG-Timer) for a Secondary MG is expired at 'N' slot, the UE is required to stop the measurement using the Secondary MG(s) after 'N' slot.

UE may stop performing measurements based on the deactivated Secondary MG pattern IDs, when the Secondary MG pattern IDs is deactivated. UE may continue to perform measurements based on Primary MG pattern ID per FR.

If needed, Network may configure Secondary MG pattern IDs per FR to be activated. (DCI-based, timer-based) as the following:

DCI-based operation

The network may transmit DCI including information that "Secondary MG(s) to be activated at 'N' slot" to the UE. When UE receives a DCI indicating Secondary MG(s) to be activated at 'N' slot, the UE is required to start the measurement using the Secondary MG(s) after 'N' slot; and/or Timer-based operation The network may transmit MG timer MG-InactivityTimer, which is used for activating secondary MG when the timer is expired, for a Secondary MG to the UE. If a MG timer MG-InactivityTimer for a Secondary MG is expired at 'N' slot, the UE is required to start the measurement using the Secondary MG(s) after 'N' slot.

UE may start performing measurements with activated Secondary MG pattern IDs. UE may continue to perform measurements with Primary MG pattern ID per FR.

If there is no information of which target Cells should be measured with configured multiple MGs, it can raise ineffective measurements. For example, if assuming 2 target cells (Cell1, Cell2) and 2 multiple MGs (MG_A, MG_B), UE is expected to measure Cell1 with either MG_A or MG_B, or with both MG_A and MB B. In case that SSB block in Cell1 is not within MG_A but within MG_B, Cell1 can be measured with MG_B but cannot be measured with MG_A. Therefore, to avoid useless measurements with multiple MGs, Network needs to inform which Cells in Cells lists can be measured with which MG pattern ID from multiple MGs.

Example 11 of proposal: Network informs to UE which Cells in Cell lists can be measured with which MG pattern ID from configured multiple MG pattern IDs.

For example, according to example 11 of proposal, the network (e.g. base station) may transmit information related to multiple MG pattern IDs and cell lists including cells that can be measured by each of the multiple MG pattern IDs, to the UE. Thus, the UE may identify cells to be measured based on each of the multiple MG pattern IDs. The UE may perform measurement for cells corresponding to each of the multiple MG pattern IDs based on the multiple MG pattern IDs.

For various examples of the present specification, parameters (information) related to Multiple MG pattern IDs may be proposed as the following. Related parameters are proposed as follows.

Example 12 of proposal: Multiple MG pattern IDs related parameters are proposed as below.

TABLE 5

| | | |
|---|---|---|
| measObjectToRemoveList_P | MeasObjectToRemoveList | OPTIONAL, -- Need N |
| measObjectToAddModList_P | MeasObjectToAddModList | OPTIONAL, -- Need N |
| reportConfigToRemoveList_P | ReportConfigToRemoveList | OPTIONAL, -- Need N |
| reportConfigToAddModList_P | ReportConfigToAddModList | OPTIONAL, -- Need N |
| measIdToRemoveList_P | MeasIdToRemoveList | OPTIONAL, -- Need N |
| measIdToAddModList_P | MeasIdToAddModList | OPTIONAL, -- Need N |

Table 5 shows an example of Cell List related to Primary MG pattern ID. Table 5 shows parameters indicating cell list related to Primary MG pattern ID.

measObjectToRemoveList_P may mean list of measurement objects to remove related to primary MG. measObjectToAddModList_P may mean list of measurement objects to add and/or modify related to primary MG. reportConfigToRemoveList_P may mean list of measurement reporting configurations to remove related to primary MG. reportConfigToAddModList_P may mean list of measurement reporting configurations to add and/or modify related to primary MG. measIdToRemoveList_P may mean list of measurement identities to remove related to primary MG. measIdToAddModList_P may mean list of measurement identities to add and/or modify related to primary MG.

TABLE 6

| | | |
|---|---|---|
| measObjectToRemoveList_S | MeasObjectToRemoveList | OPTIONAL, -- Need N |
| measObjectToAddModList_S | MeasObjectToAddModList | OPTIONAL, -- Need N |
| reportConfigToRemoveList_S | ReportConfigToRemoveList | OPTIONAL, -- Need N |
| reportConfigToAddModList_S | ReportConfigToAddModList | OPTIONAL, -- Need N |
| measIdToRemoveList_S | MeasIdToRemoveList | OPTIONAL, -- Need N |
| measIdToAddModList_S | MeasIdToAddModList | OPTIONAL, -- Need N |

Table 6 shows an example of Cell List related to Secondary MG pattern ID. Table 6 shows parameters indicating cell list related to Secondary MG pattern ID.

TABLE 7

| | | | |
|---|---|---|---|
| gapFR2_P | SetupRelease { GapConfig } | OPTIONAL, | -- Need M |
| gapFR1_P | SetupRelease { GapConfig } | OPTIONAL, | -- Need M |
| gapUE_P | SetupRelease { GapConfig } | OPTIONAL, | -- Need M |

Table 7 shows an example of Measurement Gap Configuration related to Primary MG pattern ID. GapFR2_P may mean primary MG, which is per-FR MG for FR2. GapFR1_P may mean primary MG, which is per-FR MG for FR1. GapUE_P may mean primary MG, which is per-UE MG. GapConfig may mean configuration for measurement Gap. GapConfig may be explained in detail with FIG. 12 and corresponding paragraphs.

TABLE 8

| | | | |
|---|---|---|---|
| gapFR2_S1 | SetupRelease { GapConfig } | OPTIONAL, | -- Need M |
| gapFR2_S2 | SetupRelease { GapConfig } | OPTIONAL, | -- Need M |
| gapFR2_S3 | SetupRelease { GapConfig } | OPTIONAL, | -- Need M |
| gapFR1_S1 | SetupRelease { GapConfig } | OPTIONAL, | -- Need M |
| gapFR1_S2 | SetupRelease { GapConfig } | OPTIONAL, | -- Need M |
| gapFR1_S3 | SetupRelease { GapConfig } | OPTIONAL, | -- Need M |
| gapUE_S1 | SetupRelease { GapConfig } | OPTIONAL, | -- Need M |
| gapUE_S2 | SetupRelease { GapConfig } | OPTIONAL, | -- Need M |
| gapUE_S3 | SetupRelease { GapConfig } | OPTIONAL, | -- Need M |

Table 8 shows an example of Measurement Gap Configuration related to Secondary MG pattern ID.

TABLE 9

| | |
|---|---|
| gapOffset_P | INTEGER (0 . . . 159), |
| gapOffset_S1 | INTEGER (0 . . . 159), |
| gapOffset_S2 | INTEGER (0 . . . 159), |
| gapOffset_S3 | INTEGER (0 . . . 159), |

Table 9 shows an example of Measurement Gap Offset Configuration with related to multiple MG pattern IDs. Table 9 shows examples of MG offset for Primary MG pattern ID and MG offset for three Secondary MG pattern IDs.

One example of parameters related to multiple MG pattern configurations with Primary MG pattern ID and Secondary MG pattern IDs. Here, 3 secondary MG pattern IDs are assumed. The value can be updated with different value from 1~4. That is, 3 secondary MG pattern IDs are example, and scope of the present specification is not limited to 3 secondary MG pattern IDs.

FIG. 11 shows an example of measurement configuration Information Element (IE).

The following drawings are prepared to explain a specific example of the present specification. Since the names of specific devices or names of specific signals/messages/fields described in the drawings are provided by way of example, technical features of the present specification are not limited to specific names used in the following drawings.

FIG. 11 Illustrates an Example of Measurement Configuration IE According to Embodiments of the Present Disclosure FIG. 11 shows an example of IE MeasConfig. The IE MeasConfig specifies measurements to be performed by the UE, and covers intra-frequency, inter-frequency and inter-RAT mobility as well as configuration of measurement gaps.

The following Table 10 shows examples of information included in the FIG. 11.

TABLE 10

| MeasConfig field descriptions |
|---|
| interFrequencyConfig-NoGap-r16 |
| MeasConfig field descriptions |
| If the field is set to true, UE is configured to perform SSB based inter-frequency measurement without measurement gaps when the inter-frequency SSB is completely contained in the active DL BWP of the UE, as specified in TS 38.133 [14], clause 9.3. Otherwise, the SSB based inter-frequency measurement is performed within measurement gaps. |
| measGapConfig |
| Used to setup and release measurement gaps in NR. |
| measIdToAddModList, measIdToAddModList_P/S1/S2/S3 |
| List of measurement identities to add and/or modify. |
| measIdToRemoveList, measIdToRemoveList_P/S1/S2/S3 |
| List of measurement identities to remove. |
| measObjectToAddModList, measObjectToAddModList_P/S1/S2/S3 |
| List of measurement objects to add and/or modify. |
| measObjectToRemoveList, measObjectToRemoveList_P/S1/S2/S3 |
| List of measurement objects to remove. |
| reportConfigToAddModList, reportConfigToAddModList_P/S1/S2/S3 |
| List of measurement reporting configurations to add and/or modify. |
| reportConfigToRemoveList, reportConfigToRemoveList_P/S1/S2/S3 |
| List of measurement reporting configurations to remove. |
| s-MeasureConfig |
| Threshold for NR SpCell RSRP measurement controlling when the UE is required to perform measurements on non-serving cells. Choice of ssb-RSRP corresponds to cell RSRP based on SS/PBCH block and choice of csi-RSRP corresponds to cell RSRP of CSI-RS. |
| measGapSharingConfig |
| Specifies the measurement gap sharing scheme and controls setup/ release of measurement gap sharing. |

FIG. 12 shows an example of measurement gap configuration IE.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 12 Illustrates an Example of Measurement Gap Configuration IE According to Embodiments of the Present Disclosure FIG. 12 shows an example of IE MeasGapConfig specifies the measurement gap configuration and controls setup/release of measurement gaps. The serving cell may configure mgl and mgrp included in GapConfig, based on Gap pattern ID. For example, the UE may receive GapConfig. The UE may identify Gap pattern ID based on mgl and mgrp included in GapConfig.

The following Table 11 shows examples of information included in the FIG. 12.

TABLE 11

| |
|---|
| MeasGapConfig field descriptions |
| gapFR1, gapFR1_P/S1/S2/S3 |
| Indicates measurement gap configuration that applies to FR1 only. In (NG)EN-DC, gapFR1 cannot be set up by NR RRC (i.e. only LTE RRC can configure FR1 measurement gap). In NE-DC, gapFR1 can only be set up by NR RRC (i.e. LTE RRC cannot configure FR1 gap). In NR-DC, gapFR1 can only be set up in the measConfig associated with MCG. gapFR1 can not be configured together with gapUE. The applicability of the FR1 measurement gap is according to Examples of FIG. 9 and FIG. 10. |
| gapFR2, gapFR2_P/S1/S2/S3 |
| Indicates measurement gap configuration applies to FR2 only. In (NG)EN-DC or NE-DC, gapFR2 can only be set up by NR RRC (i.e. LTE RRC cannot configure FR2 gap). In NR-DC, gapFR2 can only be set up in the measConfig associated with MCG. gapFR2 cannot be configured together with gapUE. The applicability of the FR2 measurement gap is according to Examples of FIG. 9 and FIG. 10. |
| gapUE, gapUE_P/S1/S2/S3 |
| Indicates measurement gap configuration that applies to all frequencies (FR1 and FR2). In (NG)EN-DC, gapUE cannot be set up by NR RRC (i.e. only LTE RRC can configure per UE measurement gap). In NE-DC, gapUE can only be set up by NR RRC (i.e. LTE RRC cannot configure per UE gap). In NR-DC, gapUE can only be set up in the measConfig associated with MCG. If gapUE is configured, then neither gapFR1 nor gapFR2 can be configured. The applicability of the per UE measurement gap is according to Examples of FIG. 9 and FIG. 10. |
| gapOffset, gapOffset_P/S1/S2/S3 |
| Value gapOffset is the gap offset of the gap pattern with MGRP indicated in the field mgrp. The value range is from 0 to mgrp-1. |
| mgl |
| Value mgl is the measurement gap length in ms of the measurement gap. The measurement gap length is according to in Examples of FIG. 4. Value ms1dot5 corresponds to 1.5 ms, ms3 corresponds to 3 ms and so on. If mgl-r 16 is signalled, UE shall use mgl-r16 (with suffix) and ignore the mgl (without suffix). |
| mgrp |
| Value mgrp is measurement gap repetition period in (ms) of the measurement gap. The measurement gap repetition period is according to Examples of FIG. 4. |
| mgta |
| Value mgta is the measurement gap timing advance in ms. The applicability of the measurement gap timing advance is according to clause 9.1.2 of TS 38.133 [14]. Value ms0 corresponds to 0 |
| MeasGapConfig field descriptions |
| ms, ms0dot25 corresponds to 0.25 ms and ms0dot5 corresponds to 0.5 ms. For FR2, the network only configures 0 ms and 0.25 ms. |
| refFR2ServCellIAsyncCA |
| Indicates the FR2 serving cell identifier whose SFN and subframe is used for FR2 gap calculation for this gap pattern with asynchronous CA involving FR2 carrier(s). |
| refServCellIndicator |
| Indicates the serving cell whose SFN and subframe are used for gap calculation for this gap pattern. Value pCell corresponds to the PCell, pSCell corresponds to the PSCell, and mcg-FR2 corresponds to a serving cell on FR2 frequency in MCG. |

One more discussion point is whether or not UE measurement capability of monitoring of multiple layers using MGs is impacted due to multiple MG patterns. Multiple MG patterns can be applied at any time. It means each MG can be overlapped fully or partially, or not overlapped.

In UE aspects, UE can perform measurements with only one MG ID in case of MGs overlapped fully or partially. In case of MGs not overlapped, it is same as legacy measurements. As a result, there is no impact on UE measurement capability of monitoring. It is because the UE basically uses one MG at a time for performing measurement, when the UE uses multiple MG patterns.

Example 13 of proposal: Keep the existing UE measurement capability of monitoring of multiple layers for multiple MG patterns.

Hereinafter, operation performed by the UE and operation performed by the network (e.g. base station, serving cell) will be explained with examples based on FIG. 13 and FIG. 14. Operation performed by the UE and operation performed by the network (e.g. base station, serving cell) are based on the above explained examples of the present specification.

The following drawings are prepared to explain a specific example of the present specification. Since the names of specific devices or names of specific signals/messages/fields described in the drawings are provided by way of example, technical features of the present specification are not limited to specific names used in the following drawings.

Figure 13:
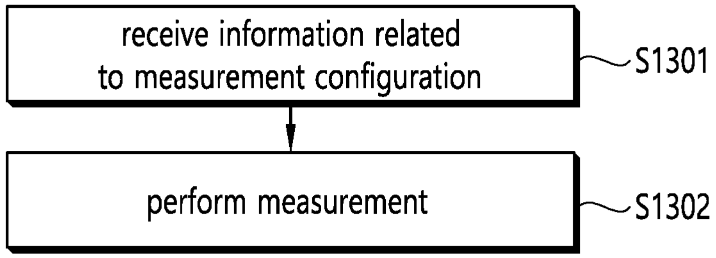
FIG. 13 illustrates an example of operations of a UE according to the present disclosure.

FIG. 13 illustrates an example of operations of a UE according to the present disclosure.

FIG. 13 shows an example of operations of the UE. UE may perform operations described in the present specification, even if they are not shown in FIG. 13. Herein, a network may be gNB, base station, serving cell, etc.

The UE may perform operations explained above with various examples.

In step S1301, the UE may receive information related to measurement configuration from a network (e.g. base station, serving cell). For example, the information related to measurement configuration may be measurement configuration information. For example, measurement configuration information may be MeasConfig of example of FIG. 11. Measurement configuration information may includes examples of information as shown in Table 5 to Table 11.

The measurement configuration information may MG information for multiple MG patterns and cell list information.

The MG information may include MG pattern information related to at least one MG pattern ID for multiple MG patterns. MG pattern information related to at least one MG pattern ID for multiple MG patterns may include MGL and MGRP corresponding to the at least one MG pattern ID. MG pattern information related to at least one MG pattern ID for multiple MG patterns may further includes gapoffset. The cell list information may include a list of a plurality of cells to be measured based on each of the multiple MG patterns.

The multiple MG patterns may include a primary MG pattern and at least one secondary MG pattern. For example, the secondary MG pattern may correspond to a different MG pattern ID with the primary MG pattern. The MG information further includes information related to gap offset (e.g. gapOffset of example of FIG. 12), which is applied to each of the multiple MG patterns. For another example, the secondary MG pattern corresponds to a same MG pattern ID with the primary MG pattern and the secondary MG pattern has different gap pattern with the primary MG pattern. The MG pattern information may include information related to a primary MG pattern and information related to at least one secondary MG pattern.

The base station may decide how to configure multiple MG patterns. For example, MG pattern IDs having same MGL may be configured for multiple MG patterns, if SMTCs are configured with same SMTC window duration.

In step S1302, the UE may perform measurement. The UE may perform measurement for the plurality of cells based on the each of the multiple MG patterns, which is configured based on the MG information. After the UE perform the measurement, the UE may transmit measurement report to the base station.

Furthermore, the UE may receive information for deactivating the at least one secondary MG pattern from the base station. For example, the information for deactivating the at least one secondary MG pattern may include Downlink Control Information (DCI) for indicating the at least one secondary MG pattern is deactivated. After the DCI is received, the UE may identify that the at least one secondary MG pattern is deactivated. For another example, the information for deactivating the at least one secondary MG pattern may include MG timer for indicating the at least one secondary MG pattern is deactivated due to expiration of the MG timer. After the MG timer (e.g. MG-Timer) expires, the UE may identify that the at least one secondary MG pattern is deactivated.

After the at least one secondary MG pattern is deactivated, the UE may performing measurement for a cell related to the primary MG pattern. That is, the UE may not use the at least one secondary MG pattern for measurement, after the at least one secondary MG pattern is deactivated.

Furthermore, the UE may receive information for activating the at least one secondary MG pattern form the base station, after the at least one secondary MG pattern is deactivated. For example, the information for activating the at least one secondary MG pattern may include DCI for indicating the at least one secondary MG pattern is activated. After the DCI is received, the UE may identify that the at least one secondary MG pattern is activated. For another example, the information for deactivating the at least one secondary MG pattern may include MG timer for indicating the at least one secondary MG pattern is activated due to expiration of the MG timer. After the MG timer (e.g. MG-InactivityTimer) expires, the UE may identify that the at least one secondary MG pattern is activated.

The following drawings are prepared to explain a specific example of the present specification. Since the names of specific devices or names of specific signals/messages/fields described in the drawings are provided by way of example, technical features of the present specification are not limited to specific names used in the following drawings.

Figure 14:
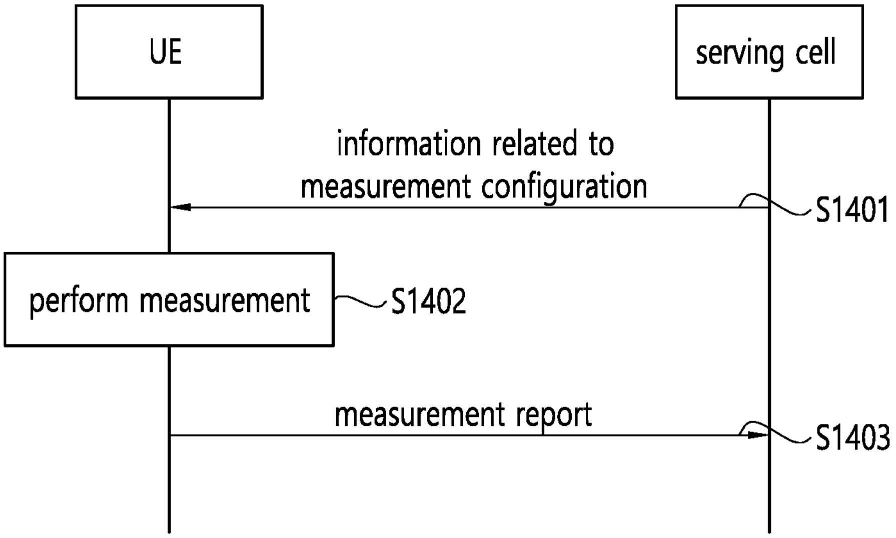
FIG. 14 illustrates an example of operations of a UE and serving cell according to the present disclosure.

FIG. 14 Illustrates an Example of Operations of a UE and Serving Cell According to the Present Disclosure FIG. 14 shows an example of operations of the UE and serving cell. UE and/or serving cell may perform operations described in the present specification, even if they are not shown in FIG. 14. Herein, a network may be gNB, base station, serving cell, etc.

The UE and the network (e.g. serving cell) may perform operations explained above with various examples.

In step S1401, the serving cell may transmit information related to measurement configuration to the UE. The UE may receive information related to measurement configuration from a network (e.g. base station, serving cell).

For example, the information related to measurement configuration may be measurement configuration information. For example, measurement configuration information may be MeasConfig of example of FIG. 11. Measurement configuration information may includes examples of information as shown in Table 5 to Table 11.

The measurement configuration information may MG information for multiple MG patterns and cell list information.

The MG information may include MG pattern information related to at least one MG pattern ID for multiple MG patterns. The cell list information may include a list of a plurality of cells to be measured based on each of the multiple MG patterns.

The multiple MG patterns may include a primary MG pattern and at least one secondary MG pattern. For example, the secondary MG pattern may correspond to a different MG pattern ID with the primary MG pattern. The MG information further includes information related to gap offset (e.g. gapOffset of example of FIG. 12), which is applied to each of the multiple MG patterns. For another example, the secondary MG pattern corresponds to a same MG pattern ID with the primary MG pattern and the secondary MG pattern has different gap pattern with the primary MG pattern. The MG pattern information may include information related to a primary MG pattern and information related to at least one secondary MG pattern.

The base station may decide how to configure multiple MG patterns. For example, MG pattern IDs having same MGL may be configured for multiple MG patterns, if SMTCs are configured with same SMTC window duration.

In step S1402, the UE may perform measurement. The UE may perform measurement for the plurality of cells based on the each of the multiple MG patterns, which is configured based on the MG information.

In step S1403, the UE may perform measurement. For example, after the UE perform the measurement, the UE may transmit measurement report to the base station.

Furthermore, the base station may transmit information for deactivating the at least one secondary MG pattern to the UE. For example, the information for deactivating the at least one secondary MG pattern may include Downlink Control Information (DCI) for indicating the at least one secondary MG pattern is deactivated. After the DCI is received, the UE may identify that the at least one secondary MG pattern is deactivated. For another example, the information for deactivating the at least one secondary MG pattern may include MG timer for indicating the at least one secondary MG pattern is deactivated due to expiration of the MG timer. After the MG timer (e.g. MG-Timer) expires, the UE may identify that the at least one secondary MG pattern is deactivated.

After the at least one secondary MG pattern is deactivated, the UE may performing measurement for a cell related to the primary MG pattern. That is, the UE may not use the at least one secondary MG pattern for measurement, after the at least one secondary MG pattern is deactivated.

Furthermore, the base station may transmit information for activating the at least one secondary MG pattern to the UE, after the at least one secondary MG pattern is deactivated. For example, the information for activating the at least one secondary MG pattern may include DCI for indicating the at least one secondary MG pattern is activated. After the DCI is received, the UE may identify that the at least one secondary MG pattern is activated. For another example, the information for deactivating the at least one secondary MG pattern may include MG timer for indicating the at least one secondary MG pattern is activated due to expiration of the MG timer. After the MG timer (e.g. MG-InactivityTimer) expires, the UE may identify that the at least one secondary MG pattern is activated.

Hereinafter, an apparatus (for example, UE) in a wireless communication system, according to some embodiments of the present disclosure, will be described.

For example, the apparatus may include at least one processor, at least one transceiver, and at least one memory.

For example, the at least one processor may be configured to be coupled operably with the at least one memory and the at least one transceiver.

For example, the processor may be configured to perform operations explained in various examples of the present specification. For example, the processor may be configure to perform operations including: receiving measurement configuration information from a base station, wherein the measurement configuration information includes Measurement Gap (MG) information for multiple MG patterns and cell list information, wherein the MG information includes MG pattern information related to at least one MG pattern ID for multiple MG patterns, and wherein the cell list information includes a list of a plurality of cells to be measured based on each of the multiple MG patterns; and performing measurement for the plurality of cells based on the each of the multiple MG patterns, which is configured based on the MG information.

Hereinafter, a processor for in a wireless communication system, according to some embodiments of the present disclosure, will be described.

For example, the processor may be configured to perform operations including: identifying measurement configuration information, wherein the measurement configuration information includes Measurement Gap (MG) information for multiple MG patterns and cell list information, wherein the MG information includes MG pattern information related to at least one MG pattern ID for multiple MG patterns, and wherein the cell list information includes a list of a plurality of cells to be measured based on each of the multiple MG patterns; and performing measurement for the plurality of cells based on the each of the multiple MG patterns, which is configured based on the MG information.

Hereinafter, a non-transitory computer-readable medium has stored thereon a plurality of instructions in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a UE to perform operations including: identifying measurement configuration information, wherein the measurement configuration information includes Measurement Gap (MG) information for multiple MG patterns and cell list information, wherein the MG information includes MG pattern information related to at least one MG pattern ID for multiple MG patterns, and wherein the cell list information includes a list of a plurality of cells to be measured based on each of the multiple MG patterns; and performing measurement for the plurality of cells based on the each of the multiple MG patterns, which is configured based on the MG information.

Hereinafter, an apparatus (for example, base station) in a wireless communication system, according to some embodiments of the present disclosure, will be described.

For example, the apparatus may include at least one processor, at least one transceiver, and at least one memory.

For example, the at least one processor may be configured to be coupled operably with the at least one memory and the at least one transceiver.

For example, the processor may be configured to perform operations explained in various examples of the present specification. For example, the processor may be configure to perform operations including: transmitting measurement configuration information to a User Equipment (UE), wherein the measurement configuration information includes Measurement Gap (MG) information for multiple MG patterns and cell list information, wherein the MG information includes MG pattern information related to at least one MG pattern ID for multiple MG patterns, and wherein the cell list information includes a list of a plurality of cells to be measured based on each of the multiple MG patterns; and receiving measurement report from the UE, wherein the measurement report is based on measurement, performed by the UE, for the plurality of cells based on the each of the multiple MG patterns, which is configured based on the MG information.

Advantageous effects which can be obtained through specific embodiments of the present disclosure. Performance of measurement based on MG is enhanced. For example, measurement based on measurement gap may be performed efficiently and/or precisely. For example, the UE may measure signals from the whole target Cells efficiently and/or precisely, even the target cells have different time offset for each SSB blocks. For example, measurement based on multiple measurement gap may performed efficiently and/or precisely. For example performance degradation due to MG may be reduced.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method, comprising:

transmitting, by a User Equipment (UE) to a base station, capability information related to concurrent measurement gaps (MGs);

receiving, by the UE from the base station, measurement configuration information, wherein the measurement configuration information includes MG information, and wherein the MG information includes two or more MG Identifiers (IDs), based on that the UE supports the concurrent MGs, wherein each of the two or more MG IDs is related to a different MG; and performing, by the UE, a measurement based on MGs, which are configured based on the MG information.

2. The method of claim 1, wherein the MG information includes a primary MG and at least one secondary MG.

3. The method of claim 2, wherein the secondary MG corresponds to a different MG ID with the primary MG.

4. The method of claim 2, wherein the MG information further includes information related to gap offset, and wherein the secondary MG relates to a same MG ID with the primary MG and the secondary MG has different gap with the primary MG.

5. A User Equipment (UE) comprising:

at least one transceiver;

at least one processor; and at least one computer memory operably connectable to the at least one processor and storing instructions that, based on being executed by the at least one processor, perform operations comprising:

transmitting, to a base station, capability information related to a concurrent measurement gap (MG);

receiving, form the base station, measurement configuration information, wherein the measurement configuration information includes MG information, and wherein the MG information includes two or more MG Identifiers (IDs), based on that the UE supports the concurrent MGs, wherein each of the two or more MG IDs is related to a different MG; and performing a measurement based on MGs, which are configured based on the MG information.

6. A method comprising:

receiving, by a base station from a User Equipment (UE), capability information related to concurrent measurement gaps (MGs); and transmitting, by the base station to the UE, measurement configuration information, wherein the measurement configuration information includes MG information, and wherein the MG information includes two or more MG Identifiers (IDs), based on that the UE supports the concurrent MGs, wherein each of the two or more MG IDs is related to a different MG; and wherein based on the MG information, a measurement based on MGs, which are configured based on the MG information is performed by the UE.

7. The method of claim 6, wherein the one or more MG IDs are transmitted, based on that the UE supports the concurrent MG.

* * * * *